Sept. 23, 1941.  W. L. HANSEN ET AL  2,256,711
SLOW SPEED SYNCHRONOUS MOTOR
Filed May 16, 1940
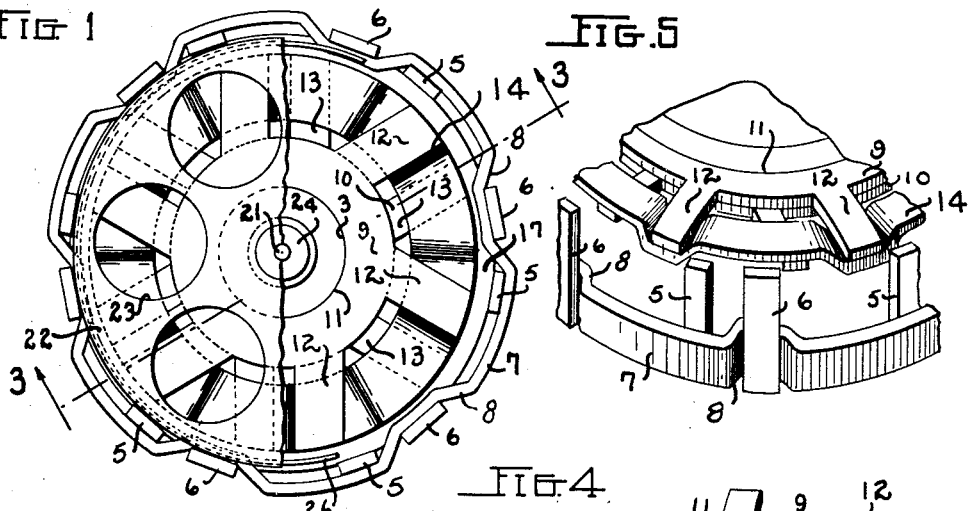
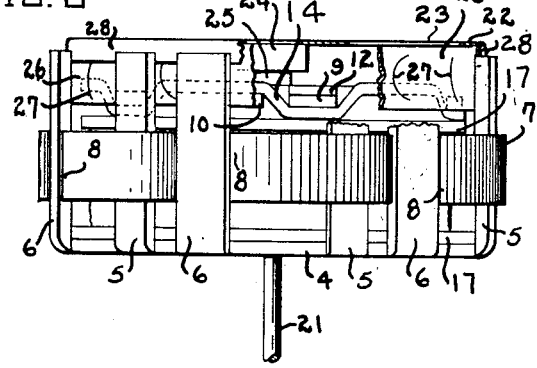
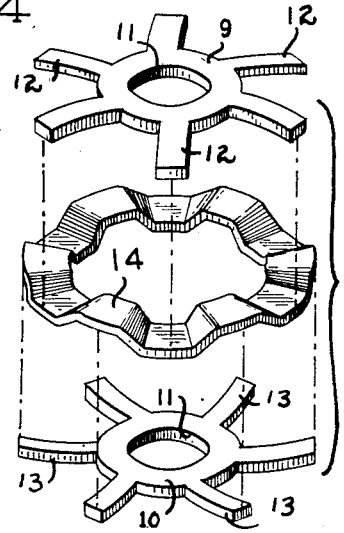
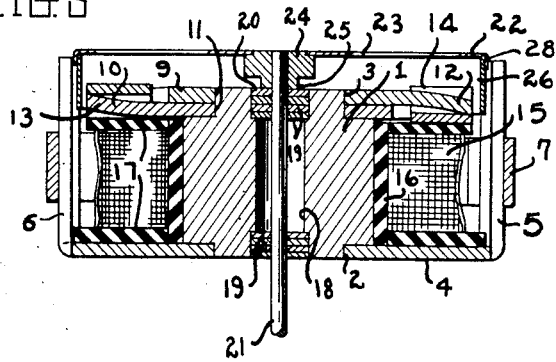
Inventors
WILLIAM L. HANSEN
IRA N. HURST
By Toulmin & Toulmin
Attorneys Patented Sept. 23, 1941

2,256,711

UNITED STATES PATENT OFFICE 2,256,711

SLOW SPEED SYNCHRONOUS MOTOR

William L. Hansen and Ira N. Hurst, Princeton, Ind., assignors to Hansen Mfg. Company, Inc., Princeton, Ind., a corporation of Indiana Application May 16, 1940, Serial No. 335,568

5 Claims. (Cl. 172—278)

This invention relates to electric motors, and in particular to electrical synchronous motors such as are employed for operating clocks.

This invention represents an improvement on the motor structure shown and described in our application Ser. No. 331,610, filed April 25, 1940, assigned to the same assignee as the present invention. The said application discloses a slow speed synchronous motor in which the magnetic circuit is formed of a plurality of laterally extending pole pieces, the tips of which are spaced away from a plurality of radially extending pole pieces, these pole pieces being taken from opposite sides of the energizing coil. A rotor is arranged to rotate within the annular space formed between the pole tips of opposite polarity. The subject of the present application deals essentially with an improvement on the structure which forms the radially extending pole pieces.

It was pointed out in said application that these pole pieces were stamped out of a single sheet of magnetic material, and that in order to place a shading ring in position it was necessary to bend each alternate pole piece upwardly, and after properly positioning the shading ring the bent pole pieces were restored to their original horizontal position, thus in effect causing the shading ring to pass over one pole piece and under the next and over the next, etc., around the entire number of radially extending pole pieces. The operation of bending upwardly the alternate radial pole pieces in order to secure the shading ring in position represents considerable work, and in the case of clock motors in which there is only a small spread between the manufacturing costs and selling prices, this bending operation may result in a large expense considered from the proportionate value standpoint.

The primary object of the present invention is to improve the construction of the type of motor in which an annular space is provided between radially and laterally extending pole pieces, this space receiving a rotor.

A more specific object is to simplify and thus render less expensive the fabrication of field structure of this type of motor, particularly the construction and arrangement of the radial pole pieces. Whereas in the prior type of motor, as shown and described in our copending application, the radial pole pieces were made of one piece and alternate pole pieces were bent to accommodate the shading ring, in the improved construction these radial pole pieces are formed from two discs, one of which provides the radial pole pieces would normally be bent to receive the shading ring and the other provides the pole pieces which would remain flat upon receiving the shading ring. By changing from a single piece or disc to a double-disc construction there is no longer any necessity for bending any of the pole pieces to receive the shading ring, so that all of the radial pole pieces maintain the same form as they had after leaving the stamping press.

Other objects and features will be apparent as the specification is perused in connection with the accompanying drawing.

In the drawing:

Figure 1 is a top plan view of the motor of this invention, with portions of the rotor structure broken away to disclose the structure thereneath.

Figure 2 is a side elevation of the motor shown in Figure 1, with the rotor structure shown in diametrical cross section in order to disclose the field structure more clearly.

Figure 3 is an axial section through the motor of Figure 1 taken along the line 3—3 in Figure 1.

Figure 4 is a perspective view of the radially extending pole pieces and shading ring, all in exploded position.

Figure 5 is an enlarged fragmentary and top perspective view of the motor of Figures 1, 2 and 3, with the rotor structure removed. The absolute positions of the elements in this figure are somewhat exaggerated in order more clearly to show the manner in which the radial pole pieces are assembled together and their relative positions with respect to one another.

Referring to the drawing in detail, the numeral 1 designates the magnetic tubular hub having reduced diameter portions 2, 3 upon which are mounted the outer and inner field pole assemblies. The outer field pole structure consists of a disc 4 having an aperture by which it is mounted on the portion 2 of the hub 1, and having axially extending pole pieces 5, 6 disposed alternately in a cylindrical path about the hub 1. The pole pieces 5, 6 are preferably not equi-distantly spaced about the disc 4, but instead are arranged in pairs around the periphery of the disc, as can best be seen in Figure 1. The alternate pole pieces 6 are preferably of greater width than the pole pieces 5 and are shaded by an undulating ring 7 of non-magnetic material, such as copper. This ring passes over the outer surfaces of the pole pieces 5 and therefore does not shade them. The shading ring 7, however, is provided with undulating portions 8 passing around three sides of the pole pieces 6, thereby shading these pole pieces and providing a phase lag when the field structure is magnetized by an alternating flux.

The inner field pole assembly consists of a pair of star-shaped discs 9, 10 (Figure 4), having an aperture 11 by which they are mounted on the portion 3 of the hub 1. The disc 9 is provided with pole pieces 12 which extend outwardly, and are so positioned that a center line drawn through each pole piece will run parallel with a center line drawn through the directly opposite pole piece. As can be seen more clearly in Figure 4, the inside edge of one pole piece is practically in line with the inside edge of the opposite pole piece so that these two pole pieces are not directly in line with one another, although in a general way they may be considered as extending radially from the disc 9. The pole pieces 12 are all bent slightly downwardly at their tips to give, in general, a dished appearance. The lower disc 10 has similar outwardly extending pole pieces 13, which as in the case of the upper disc, do not have a strictly radial direction. The reason for the non-radial relation between the pole pieces 12 and 13 will be explained hereinafter. It will be noted that the pole pieces 13 are bent slightly upwardly at their tips so that the disc 10 is dished in the opposite direction from the disc 9. It will also be noted that the pole pieces 13 are considerably narrower, i. e. of less width than the pole pieces 12, and the reason for this will also be explained hereinafter.

In addition to the two discs 9 and 10, Figure 4 shows a shading ring 14 fabricated of copper and having an undulating ribbon-like configuration. The position of these undulations are such that the upwardly extending portions are positioned directly over the narrow pole pieces 13 when the motor is assembled and the downwardly extending portions are adapted to receive the wide pole pieces 12. Figure 5 shows this arrangement quite clearly, except that the upwardly extending loops or undulations of the shading ring 14 are somewhat exaggerated from corresponding portions shown in Figure 4 in order more clearly to bring out the relative positions assumed by the pole pieces 12 and 13, also the position of the shading ring 14 with respect thereto.

Assuming that the undulations of the shading ring 14 are of equal length and depth about the ring, it is apparent that the copper ring will closely hug three sides of the wide pole pieces 12 but will leave considerable space between the pole pieces 13 and the nearest side of the ring. This arrangement, in effect, causes the wide pole pieces 12 to be surrounded on three sides by the shading ring, thereby causing a magnetic shading effect to be produced therein, but the shading ring merely passes over the top surfaces of the narrow pole pieces 13 and does not produce any material shading effect therein. From the foregoing it is evident that the shading ring 7 serves to introduce a magnetic shading effect into the lateral pole pieces 6, whereas the shading ring 14 introduces a similar shading effect into the radial pole pieces 12.

The field structure formed by the radial pole pieces 12, 13 and the axial pole pieces 5, 6 is magnetized by a field coil 15 wound on a drum 16 of insulating material and contained between a pair of webs 17, also of insulating material. The drum 16 is mounted on the hub 1 and secured thereto in any suitable and well known manner. There is a pair of leads (not shown) connected to the opposite sides of the coil 15 and adapted to be connected to a suitable source of alternating current. The magnetic hub 1 is provided with an axial bore 18, plugged at each end by three or more washers 19. A thrust bearing washer 20 may be carried by the upper surface of the uppermost washer 19. The washers 19, 20 have an opening at the center which receives the shaft 21 of a rotating disc 22 made of a light material, such as aluminum, and provided with equi-distantly spaced openings 23. These openings are provided mainly to cut down the weight of the metal.

The disc 22 is secured to the shaft 21 preferably through a hub member 24, which has a downwardly extending shoulder 25 bearing against the thrust washer 20. The space within the bore 18, and between the shaft 21 and the inner washers 19, may be filled with a liquid or solid lubricant. The disc 22 terminates in a peripheral flange 28 which receives the rotor 26, in the form of a cylindrical band of hardened magnetic steel. The rotor 26 is preferably radially thin and axially wide, light in weight and in a single piece. The band may either be continuous or consist of a strip of magnetic steel which is bent into circular form and sprung into place within the flange 25. While various types of rotors may be used, we prefer to employ the type which is disclosed and claimed in our copending application Ser. No. 282,719, filed July 3, 1939, and assigned to the same assignee as the present invention.

The rotor band 26 is provided with circumferentially spaced incisions 27, preferably as many as there are pairs of poles, and equi-distantly spaced, which incisions serve to interrupt the magnetic path and in this manner to provide pole pieces around the rotor band. We prefer to form the incisions while the rotor material is in a flat condition, and after the strip has been hardened in any suitable and well known manner it is sprung into place within the flange 25, where it is firmly held due to the resilience of the metal. The rotor band 26 should preferably be made somewhat wider, as measured in an axial direction, than the thickness of the pole pieces 12, 13, so as completely to extend over the entire area presented by the pole tips of the radially projecting and laterally projecting pole pieces. In this respect it will be noted that the laterally or axially projecting pole pieces 5, 6 extend upwardly for a considerable distance beyond the upper surfaces of the radial pole pieces 12, and it will be further noted that the upper edge of the rotor band 26 extends just beyond the upper edges of the pole pieces 5 and 6.

Figure 3 clearly shows the positional relation between the rotor band 26 and the radial and axial pole pieces, while Figure 5 shows in somewhat exaggerated form the positional relationship between the radial and axial pole pieces. As will be seen from these figures, the radial pole pieces 12, 13 are not in line with the axial pole pieces 5, 6 but that the pole piece 12 is positioned at an angle in a clockwise direction with respect to the pole piece 5, and the pole piece 13 is positioned at a similar angle but measured in the counter-clockwise direction with respect to the pole piece 6. In other words, the radial pole pieces 12, 13 are positioned intermediate the pole piece 5 of one pair of axial pole pieces and the pole piece 6 of the adjacent pair of axial pole pieces. However, the radial pole pieces do not extend as far as the axial pole pieces but stop short to leave an annular space which receives the rotor band 26.

It will be further apparent that the upper edge of the right-hand group of pole pieces 12, as seen in Figure 1, is practically in line with the lower edge of the adjacent pole pieces 5, and that the lower edge of the corresponding pole pieces 13 is in line with the upper edge of the adjacent pole pieces 6. The angle at which the pole pieces 12, 13 either follow or precede their adjacent pole pieces 5, 6 constitutes a so-called "lead" angle which serves to assist in the creation of a rotating field and determines the direction in which the field rotates. However, it will be understood that the relative positions of the pole pieces 12, 13 with respect to the opposing pole pieces 5, 6 are subject to experiment and adjustment, depending on the compromise desired between the starting and operating torques and also on the use to which the motor is put. However, in general, we have obtained very satisfactory results when the radial pole pieces 12, 13 have approximately the relative positions shown in Figure 1 with respect to the axial pole pieces 5, 6.

In the fabrication of the improved motor the first step is to mount the coil 15 on the hub 1, after which the disc 4 is placed in position on the hub. The shading ring 7 is then pressed downwardly about the cylindrical path of the axial pole pieces, causing the undulations 8 closely to embrace the wider pole pieces 6, as can be seen in Figure 5. The next step is to apply the disc 10 to the hub 1 with the pole pieces 13 bent upwardly and positioned angularly with respect to the axial pole pieces, in the manner shown in Figure 5 and described hereinbefore. The shading ring 14 is then placed over the disc 10 and rotated slightly to cause the pole pieces 13 to fit into the upstanding undulations of the ring. Finally, the disc 9 is placed over the shading ring 14 with the pole pieces 12 extending downwardly so as to fit snugly into the downwardly extending undulations of the ring 14. Assuming that the pole pieces 13 have been properly positioned with respect to the pole pieces 5, 6, the pole pieces 12 will automatically take the positions shown in Figure 5 with respect to the axial pole pieces. The field circuit is then complete, and it is only necessary to peen the metal of the discs 4 and 9 to the hub 1 at the shoulders 2, 3 respectively, or in any other suitable manner secure these discs to the hub.

It will be noted that when the disc 9 is peened to the hub the shading ring 14, also the lower disc 10, are firmly secured in place. Moreover, the other shading ring 7 is securely held in position by the tight fit with which the undulations 8 embrace the pole pieces 6. Consequently all of the elements which comprise the field structure, also the shading rings, are held firmly in position by the simple act of peening the uppermost disc 9 and the lower disc 4 to the hub. It is preferred that the discs 9 and 10 are given such a curvature downwardly and upwardly, respectively, (as seen in Figure 4) that the tips of the pole pieces 12, 13 are substantially in line with one another. It is apparent that the proper amount of curvature may be readily given to the discs at the time they are stamped to the desired shape. On the other hand, the discs 9 and 10 may, if desired, have a completely flat configuration, i. e. without any curvature, and the only disadvantage in this respect would be that the rotor band 26 would be made wider, as measured in the axial direction, in order to be presented to all of the surfaces of the radial pole tips.

In the operation of the motor shown in the drawing, the field coil 15 is energized by connecting its leads (not shown) to a suitable source of alternating current, such as the ordinary house wiring circuit of 110-volt 60-cycle alternating current. The alternations of the current alternately magnetize the field poles with opposite polarities, but the shaded field poles undergo a phase lag relative to the unshaded poles so that a starting force is applied to the rotor 26, causing it to rotate on its shaft 21. The motor shaft 21 is preferably connected to reduction gearing (not shown), by which its speed is reduced to one R. P. M. ordinarily employed in driving electrical synchronous clocks. It is apparent that the pole pieces 5, for example, which extend from the lower end of the coil 15 will have an instantaneous magnetic polarity opposite from the adjacent pole pieces 12 which extend from the top of the coil. The flux passing between the pole pieces 5, 12, also between the pole pieces 6, 13, is necessarily intercepted by the rotor 26 because the latter is interposed between the pole pieces and extends considerably above and below these pole pieces. Consequently, all leakage of non-useful flux is eliminated, and all that part of the electrical energy supplied to the coil 15 which is transformed into flux is applied directly to the rotor, giving to the latter a strong starting and operating torque. It will be understood that the effect of the shading ring 7 is to induce a flux in the shaded pole piece 6 which opposes the flux produced therein by the coil 15. The shading ring 14 induces a similar opposing flux in the shaded pole pieces 12. However, due to the winding of the shaded pole pieces the cross sectional area is correspondingly increased and the reluctance of these shaded elements is reduced.

From the foregoing it is evident that we have disclosed a magnetic structure which is of simple design, and relatively inexpensive to make in that the radial pole pieces are formed from two discs between which the shading ring 14 is sandwiched. In order to apply the shading ring 14 it is no longer necessary to bend any of the radial pole pieces out of position, because by making these pole pieces out of two discs instead of one the shading ring may be readily placed in position over one set of radial pole pieces and under the other set of radial pole pieces, as can be readily seen in Figure 4. Moreover, by providing two discs for the radial pole piece structure rather than one disc the amount of iron is increased with consequent reduced reluctance, and this desirable result is obtained without materially increasing the thickness of the field structure as a whole.

The discs 9 and 10 and the radiating pole pieces 12 and 13, respectively, may be readily punched and shaped in one operation. The shading ring 14 may be similarly made so that the entire radial pole and shading ring structure calls for relatively inexpensive metal-working operations. The improved construction of the magnetic field member is such that one of the star-shaped washers or discs 9, for example, may contain all of the wider shaded portions of the radial pole pieces and the other disc 10 may contain all of the narrow radial pole pieces. This increases the facility with which these pole pieces may be stamped out and pressed to shape.

It will be understood that we desire to comprehend within the invention such modifications as come within the scope of the claims and the invention.

Having thus fully described our invention, what we claim as new and desire to secure by Letters Patent, is:

1. In a synchronous motor, a magnetic core, a magnetic field member mounted on one end of said core and having outer pole pieces disposed axially in a substantially cylindrical path, a second magnetic field member mounted on the other end of said core and having inner pole pieces of substantially rectangular cross section disposed radially with their tips spaced from the tips of the axial pole pieces to leave an annular opening between the pole tips, a rotor positioned within said annular opening, and a shading member, said second magnetic field member comprising a pair of discs with their flat surfaces presented to one another, each disc being provided with at least a portion of said inner pole pieces, the pole pieces of one disc being interposed between the pole pieces of the other disc, said shading member being constituted of a single element and provided with oppositely directed undulated portions throughout its length, the alternate undulations of the shading member being adapted to extend around three sides of each radial pole piece forming part of one of said discs and the remaining undulated portions of the shading member being adapted to pass along only one side of each radial pole piece of the other of said discs.

2. In a synchronous motor, a magnetic core, a magnetic field member mounted on one end of said core and having outer pole pieces disposed in a substantially cylindrical path, said pole pieces being arranged in pairs with a greater angular distance between said pairs than between the pole pieces of each pair, a second magnetic field member mounted on the other end of said core and having inner pole pieces disposed radially with their tips spaced from the tips of the axial pole pieces to leave an annular opening between the pole tips, said inner pole pieces being arranged in pairs which are positioned with respect to the pairs of outer pole pieces such that radial lines drawn through the middle of each inner pole piece intercept said cylindrical path of said outer pole pieces at positions between adjacent pairs of outer pole pieces, a rotor positioned within said annular opening, said second magnetic field member comprising a pair of discs with their flat surfaces facing one another and from which the inner pole pieces extend, the pole pieces of one disc being interposed between the pole pieces of the other disc when the discs are assembled, and a shading member having an undulating ribbon-like configuration extending around alternate radial pole pieces.

3. In a synchronous motor, a magnetic core, a magnetic field member mounted on one end of said core and having outer pole pieces disposed axially in a substantially cylindrical path, a second magnetic field member mounted on the other end of said core and having inner pole pieces of substantially rectangular cross section and disposed radially with respect to one another, the radial pole pieces being separated from the axial pole pieces to leave a space of sufficient width to receive a rotor, the radially disposed pole pieces being out of line with the axially disposed pole pieces, said second magnetic field member comprising a pair of discs with their flat surfaces facing one another and separated by a shading member, said shading member having an undulating ribbon-like configuration the alternate undulations of which extend around three sides of each alternate radial pole piece and the remaining undulations pass along one side of each of the remaining radial pole pieces.

4. In a synchronous motor, a magnetic core, a magnetic field member mounted on one end of said core and having outer pole pieces disposed axially in a substantially cylindrical path around said member, a second magnetic field member mounted on the other end of said core and comprising a pair of ring-shaped members each provided with radially extending portions of substantially rectangular cross section to form inner pole pieces, the last-mentioned members being presented flatwise to one another whereby the inner pole pieces extend toward the outer pole pieces, a rotor cooperating with all of said pole pieces, and a shading member formed of a ring in which the flat surfaces thereof are provided with successively occurring oppositely directed projections, one set of projections extending along at least two surfaces of each inner pole piece of one of the magnetic ring-shaped members and the other set of projections extending along only one surface of each inner pole piece of the other of said magnetic ring-shaped members.

5. In a synchronous motor, a magnetic core, a magnetic field member mounted on one end of said core and having outer pole pieces disposed axially in a substantially cylindrical path around said member, a second magnetic field member mounted on the other end of said core and comprising a pair of ring-shaped members each provided with radially extending portions of substantially rectangular cross section to form inner pole pieces, the last-mentioned members being presented flatwise to one another whereby the inner pole pieces extend toward the outer pole pieces, a rotor cooperating with all of said pole pieces, and a shading member formed of a ring in which the flat surfaces thereof are provided with successively occurring oppositely directed projections, one set of projections extending along at least two surfaces of each inner pole piece of one of the magnetic ring-shaped members and the other set of projections extending along only one surface of each inner pole piece of the other of said magnetic ring-shaped members, each of the inner pole pieces along which the shading member extends over at least two surfaces thereof being wider than each inner pole piece along which the shading member extends over only one surface thereof.

WILLIAM L. HANSEN.
IRA N. HURST.